(12) United States Patent
Jayasimha et al.

(10) Patent No.: US 8,335,468 B2
(45) Date of Patent: Dec. 18, 2012

(54) SHORT-PERIODICITY CARRIER ACQUISITION FOR SATCOM INTERFERENCE CANCELLATION

(75) Inventors: Sriram Jayasimha, Hyderabad (IN); Jyothendar Paladugula, Hyderabad (IN)

(73) Assignee: EMC SATCOM Technologies, LLC, Miami, FL (US)

( * ) Notice: Subject to any disclaimer, the term of this patent is extended or adjusted under 35 U.S.C. 154(b) by 72 days.

(21) Appl. No.: 12/946,492

(22) Filed: Nov. 15, 2010

(65) Prior Publication Data
US 2011/0275326 A1   Nov. 10, 2011

Related U.S. Application Data

(60) Provisional application No. 61/332,518, filed on May 7, 2010.

(51) Int. Cl.
*H04B 7/14* (2006.01)
(52) U.S. Cl. .......................... 455/18; 455/63.1
(58) Field of Classification Search .............. 455/10, 455/12.1, 18, 21, 63.1, 65; 375/286, 343
See application file for complete search history.

(56) References Cited

U.S. PATENT DOCUMENTS
2004/0228270 A1 * 11/2004 Chen et al. .................... 370/210
2008/0112479 A1 * 5/2008 Garmany et al. ............. 375/231

OTHER PUBLICATIONS

S. Stein, Algorithms for Ambiguity Function Processing, IEEE Transactions on Acoustics, Speech, and Signal Processing, vol. ASSP-29, No. 3, Jun. 1981, pp. 588-599.
W.L. Pritchard, H.G. Suyderhoud, and R.A. Nelson, Satellite Communication Systems Engineering, 2nd Ed., 1993, pp. 62-80, pp. 98-104, pp. 125-131, Prentice-Hall, Inc.
S. Jayasimha and P. Jyothendar, Canceling Echoes Distorted by Satellite Transponders, Advances in Communications: Proceedings of the 12th National Conference on Communications (NCC 2006), Jan. 27-29, 2006, pp. 112-116, Omega Scientific Publishers.
Digital Video Broadcasting (DVB); Second generation framing structure, channel coding and modulation systems for Broadcasting, Interactive Services, News Gathering and other broadband satellite applications, v1.1.2 (Jun. 2006), European Standard Telecommunications series EN 302 307.

* cited by examiner

*Primary Examiner* — Ping Hsieh
(74) *Attorney, Agent, or Firm* — Blank Rome LLP (57) ABSTRACT

A technique for interference cancellation in a satellite communication system involves an autocorrelation on the hub signal to detect a periodicity in the hub signal, determining a search range for a delay in the hub echo signal in accordance with the periodicity, locating the delay in the hub echo signal, and performing the interference cancellation in accordance with the delay. In the case of periodicity, a delay is acquired (either true or false) that provides cancellation (provided that the period does not change). When the period changes, cancellation is discovered to be poor, and another delay (that may be true or false) is acquired that provides good cancellation and so on.

19 Claims, 7 Drawing Sheets

SHORT-PERIODICITY CARRIER ACQUISITION FOR SATCOM INTERFERENCE CANCELLATION

REFERENCE TO RELATED APPLICATION

The present application claims the benefit of U.S. Provisional Patent Application No. 61/332,518, filed May 7, 2010, whose disclosure is hereby incorporated by reference in its entirety into the present disclosure.

FIELD OF THE INVENTION

The present invention is directed to duplex frequency reuse satellite communications and more particularly to such communications in which ambiguity in a delay is resolved so that interference can be canceled.

DESCRIPTION OF RELATED ART

Figure 1:
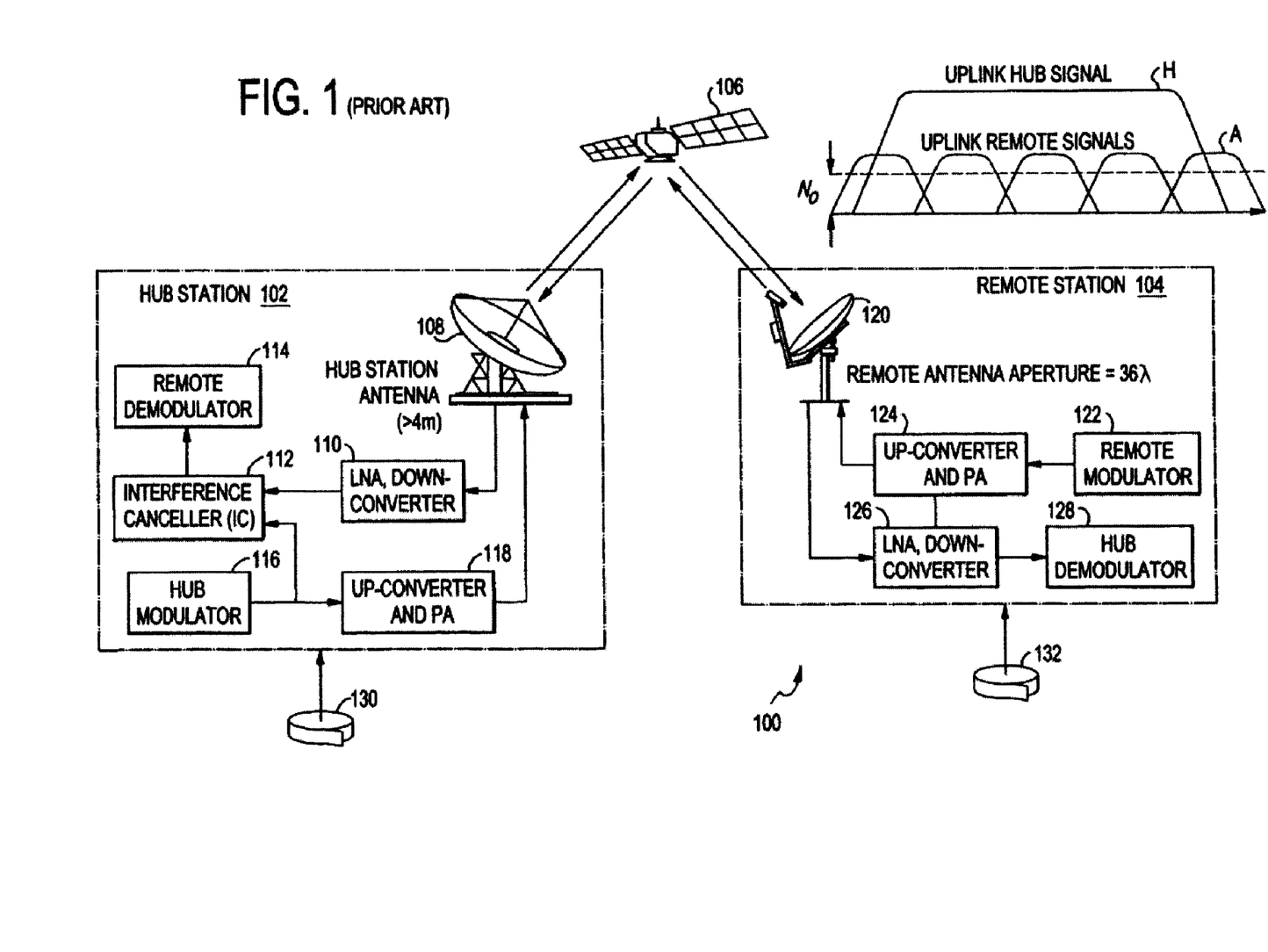
FIG. 1 is a schematic diagram showing an SCPC/TDMA system with IC.

FIG. 1 shows a conventional duplex communication system using a satellite transponder with independent forward and return links. In the system 100, a hub station 102 communicates with remote stations 104 via satellites 106. The hub station 102 includes a hub station antenna 108 (typically having an aperture of more than 4 m), an LNA (low-noise amplifier) and down-converter 110, an interference canceller (IC) 112, a remote demodulator 114, a hub modulator 116, and an up-converter and PA (power amplifier) 118. The remote station 104 includes a remote antenna 120 (typically having an aperture of 36 times the wavelength), a remote modulator 122, an up-converter and PA 124, an LNA and down-converter 126, and a hub demodulator 128. Software to operate the stations 102, 104 can be supplied in any suitable manner, e.g., on tangible persistent storage media 130, 132 and accessed and implemented by a processor. It can also be supplied as an article of manufacture, e.g., the persistent storage media 130, 132.

Typically, the hub 102 transmits information to the remotes 104 using a wideband carrier via time division multiple access (TDMA). The return link (from the remote very small aperture terminals 104—VSATs—to the hub 102) is typically single channel per carrier (SCPC, otherwise termed frequency division multiplexing). The SCPC and TDMA bands may not overlap (conventional system) or overlap (interference cancellation system). The interference canceller (IC) 112 removes the replica of the returned hub signal and passes the remote signals to remote demodulators.

In a duplex frequency re-use satellite system such as that of FIG. 1, the complex ambiguity function between the transmitted and received signals is used to acquire a differential delay and a differential frequency offset between the transmitted signal and the received echo. The ambiguity function is $$\chi(\tau, f) = \int_0^T A(t) \cdot H^*(t+\tau) \cdot e^{-j2\pi ft}\, dt,$$

where H(t) and A(t) are the complex reference and replica envelopes (that may have correlated components). Here, $\chi(\tau, f)$ depends on $\tau$ and f, which are the differential delay and the frequency offset respectively. In case the correlated component of H(t) and A(t) is a white random process, then $\chi(\tau, f) = A\delta(\tau_0, f_0)$. However, in the case considered here, $\chi(\tau, f)$ may have multiple peaks.

Figure 2A:
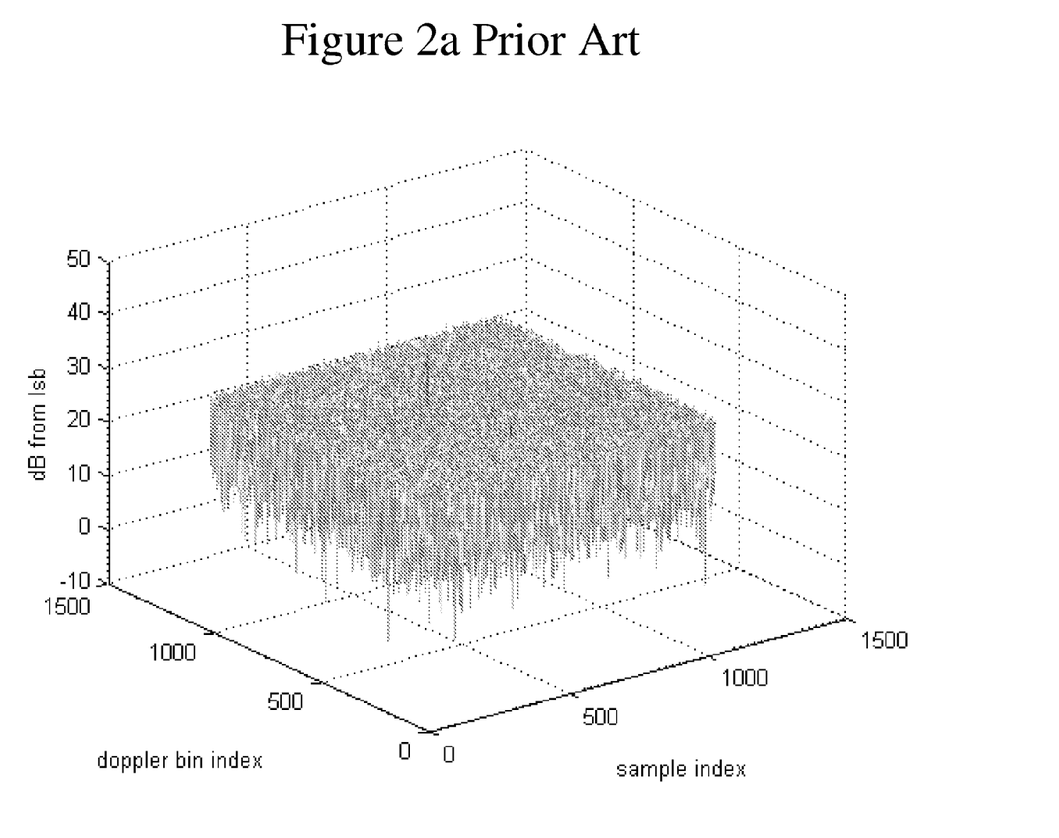
FIG. 2a is a plot of the ambiguity function of an aperiodic sequence.
Figure 2B:
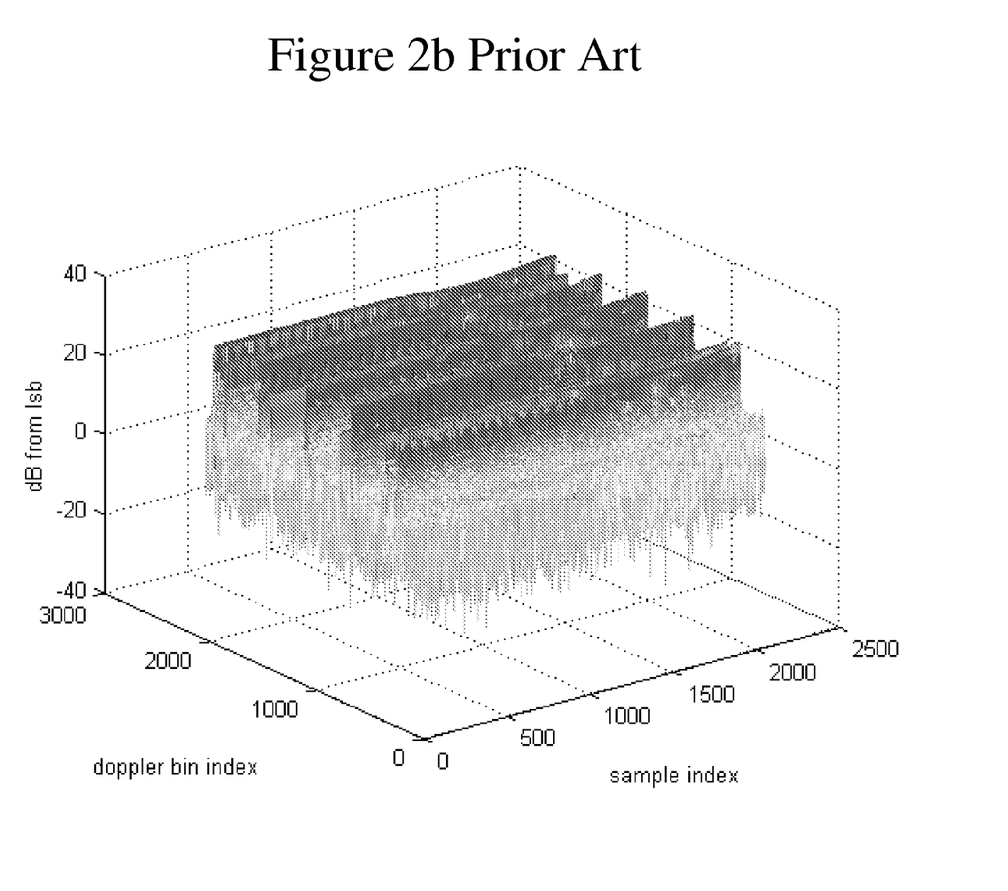
FIG. 2b is a plot of the ambiguity function of a periodic sequence.

The above assumes an ideal case in which the modulator output is aperiodic (at least for the duration of the satellite round trip delay, typically 230-290 ms), leading to one unique correlation peak (FIG. 2a). However, when the modulator output has a shorter periodicity (particularly for high rate data, with no or constant data), several correlation peaks in both time and frequency domains result (FIG. 2b). This leads to an ambiguity in selecting a peak for IC tracking. More generally, ambiguity can arise when the transmitted signal repeats with a periodicity less than the round-trip delay.

SUMMARY OF THE INVENTION

It will be seen from the above that a need exists in the art to resolve the above-noted ambiguity so that adequate interference suppression is obtained even with short periodicities.

It is therefore an object of the invention, in at least some embodiments, to provide a delay/Doppler acquisition process that provides for resolution of the ambiguity.

It is another object of the invention, in at least some embodiments, to provide a delay/Doppler acquisition process that may acquire an incorrect delay, yet still produce adequate IC.

It is still another object of the invention, in at least some embodiments, to provide such a process that ensures that loss of synchronization is detected when the periodicity changes, allowing IC to reacquire.

To achieve the above and other objects, the present invention is directed to interference cancellation in a satellite communication system, involving an autocorrelation on the hub signal to detect a periodicity in the hub signal, determining a search range for a delay in the hub echo signal in accordance with the periodicity, locating the delay in the hub echo signal, and performing the interference cancellation in accordance with the delay.

Ambiguity resolution sufficient for adequate interference suppression assumes greater significance in the context of duplex frequency reuse systems allowing lightly-loaded DVB-S2 transmitted frames (e.g., 3300-symbol DVB-S2 transmitted frames) (with synchronous scramblers). Such systems are commonly encountered in practice. The present invention encompasses a state-transition diagram and method that address this need without in any way changing the operating characteristics when conventional scrambled waveforms are used.

A delay is acquired (either true or false) that provides cancellation (provided that the period does not change). When the period changes, cancellation is discovered to be poor (due to having acquired the signal to a "false" delay). Another delay is acquired (that may be true or false) that provides good cancellation, and so on.

When we have significant periodic components (in the uplink signal), it is not known whether the signal is acquired to the correct delay (because of ambiguity to n×period). However, the cancellation is substantially improved even if the signal is acquired to an incorrect delay.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

A preferred embodiment of the present invention will be set forth in detail with reference to the drawings. The preferred embodiment, or any other embodiment, can be implemented using the hardware of FIG. 1 or any other suitable hardware.

Figure 3:
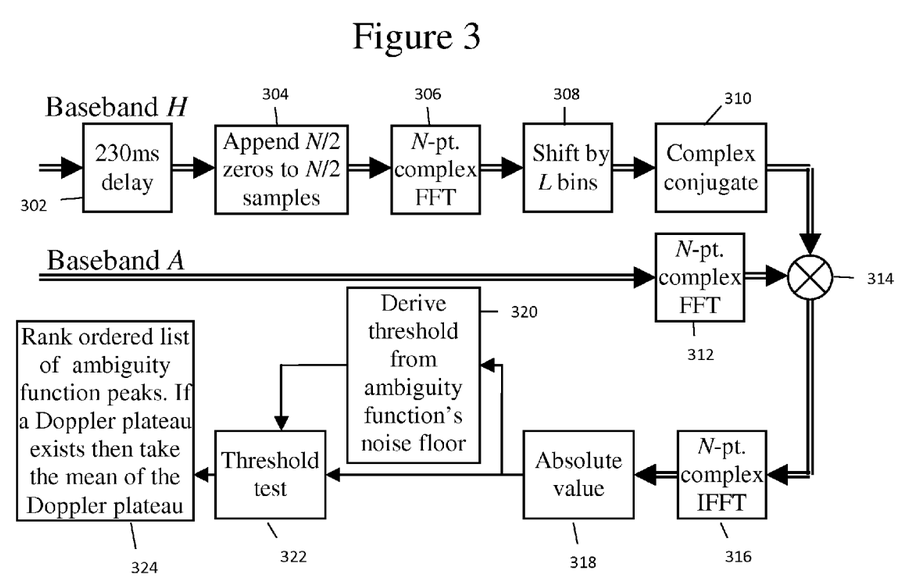
FIG. 3 is a flow chart of an ambiguity function process.

FIG. 3 shows ambiguity function blocks with fast Fourier transform (FFT) based computation of cross-correlations between the hub signal (H) and the hub echo signal (A) to estimate the differential delay and the Doppler simultaneously for an aperiodic modulator data sequence. This figure shows steps for determining the satellite channel differential delay and Doppler using the transmitted (H) and received (A) signals. The steps shown in FIG. 3 are to implement a suitable ambiguity function, preferably such as disclosed in S. Stein, "Algorithms for Ambiguity Function Processing," *IEEE Transaction on Acoustics, Speech and Signal Processing*, Vol ASSP-29, No. 3, June 1981. However, the present invention offers improvements over the Stein technique in terms of ambiguity resolution, as described herein.

For a high bandwidth IC, cross-correlations over a 60 ms span (230 ms-290 ms, this range being adequate for geosynchronous satellites with small orbital inclination, as it is the nominal satellite channel propagation delay obtained as a function of the latitude and longitude of the earth) to obtain both fine delay and fine Doppler simultaneously would require an unreasonably large FFT (fast Fourier transform) size. To overcome this in practice, the correlations are first done at a lower sampling rate to obtain a fine Doppler and coarse delay. The estimated delay is further refined by repeating the process for two more sampling rates, the next one at an intermediate sampling rate and the final one at a sampling rate higher than the signal bandwidth.

More specifically, in step 302, a delay of 230 ms is applied to the baseband H. The value of 230 ms is selected in this particular embodiment because it is the minimum delay in the range of delays noted above; the acquisition process in the IC can then search over the 60 ms range for the remaining delay. In step 304, N/2 zeros are appended to N/2 samples to provide N points. In step 306, an N-point complex fast Fourier transform (FFT) is performed. In step 308, that transform is shifted by L bins, and in step 310, the complex conjugate is taken. Meanwhile, in step 312, an N-point FFT of the baseband A is performed. The two are correlated in step 314. In step 316, the N-point inverse fast Fourier transform (IFFT) is taken, and in step 318, its absolute value is taken. In step 320, the threshold is derived from the ambiguity function's noise floor. In step 322, a threshold test is applied. This is done because the correlated component is a white process; the threshold test of step 322 determines whether the correlated component has a peak and can thus be considered valid. In step 324, a rank-ordered list of ambiguity function peaks is produced, and if a Doppler plateau exists, then the mean of the Doppler plateau is taken. To account for varying Doppler due to satellite movement, Doppler peaks within 3.5 dB of the maximum peak at the acquired delay are obtained. If such peaks are found and they form a neighborhood, then it is treated as a plateau, and the average of the plateau is decided as the estimated Doppler. The values of L and N are design choices dependent on the system and within the ability of those skilled in the art who have reviewed the present disclosure.

When the H signal's periodicity is much less than the satellite round trip delay (for example, when a DVB-S2 modulator's synchronous scrambler is driven by no data or periodic data), there will be several delay correlation peaks at the H signal's periodicity ($\tau_p$) and Doppler correlation peaks at the inverse of the H signal's periodicity ($1/\tau_p$). For the above-noted range of delays of 230-290 ms, a periodicity less than 60 ms is considered to be much less. Under this condition, the acquisition ranking check is unlikely to find a correct peak with best rank. Since the H signal is periodic, acquisition can lock onto any one of the delay correlation peaks. However, only one of the many delay and Doppler peaks is the true delay and Doppler peak.

Figure 4:
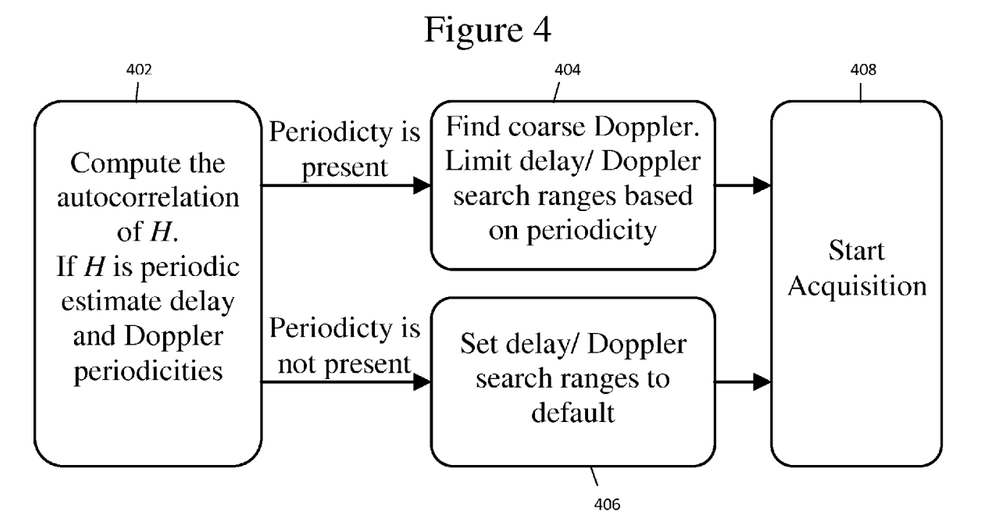
FIG. 4 is a flow chart of the pre-acquisition steps for acquiring an ambiguous delay according to the preferred embodiment.

Delay ambiguity is resolved in the following manner, which will be explained with reference to FIG. 4. Step 402 is a pre-acquisition step of computing H's autocorrelation to determine the rate at which the periodic correlation peaks are present, which is the reciprocal of the periodicity. If periodicity is found (i.e., the autocorrelation of H results in more than one peak), then in step 404, the range for a further delay search is limited to this periodicity during acquisition. The Doppler ambiguity is resolved by acquiring a coarse frequency offset at a higher decimation stage and then limiting the search range to the inverse of the delay periodicity during fine Doppler acquisition. If no periodicity is found, then in step 406, the delay and Doppler search ranges are set to their default values The default differential delay and Doppler search range in the present embodiment are 60 ms and ±8 kHz respectively, as they are in FIG. 3. Either way, acquisition starts in step 408, in which a process such as that of FIG. 3 is carried out.

As an example, a DVB modulator configured for 47 Mbaud, QPSK, FEC rate-1/2, RS-188/204, external data (but no data, input is all zeros), would cause the ambiguity function to have cross-correlation peaks with a delay ambiguity of 277.79 μs and a Doppler ambiguity of 3599.87 Hz. These ambiguity parameters, obtained by examining the autocorrelation of H, are then used to limit the delay/Doppler search ranges (see FIG. 4). The delay search range is 278 μs, and the Doppler search range is 3600 Hz. Since the peak acquired is ambiguous, a change in loading (or periodicity) might cause poor cancellation. In the present example, the values 278 μs and 3600 Hz are chosen because they are integer numbers; FFT/IFFT bin resolution will choose (round up to) the next higher integer number based on the sampling rate.

As described above, IC may acquire an ambiguous delay when the H signal is periodic. IC continues to cancel the interference as long as the H modulator's periodicity and data loading are unchanged. However, as random data loading increases, the periodic component in the H signal decreases, and the aperiodic component increases. If the IC acquired an ambiguous delay (that is not the true delay), cancellation degrades as the aperiodic component increases. When cancellation is unacceptably low, the IC's loss-of-synchronization detector should trigger, allowing it to re-acquire to a better new ambiguous/unique delay. When the change in the H signal's aperiodic-to-periodic ratio is large, the IC automatically detects loss of cancellation, allowing re-acquisition to a better delay. However, when this ratio changes gradually, the mean square error (MSE) between the autocorrelation function of H during tracking and the autocorrelation function of H obtained at the time of acquisition is monitored to detect a loss of synchronization. The autocorrelation function of H is normalized to the peak of the function to account for variations in the H signal level during tracking to that of acquisition, thereby obtaining a normalized MSE (below, MSE is to be taken to mean this normalized MSE).

Figure 5:
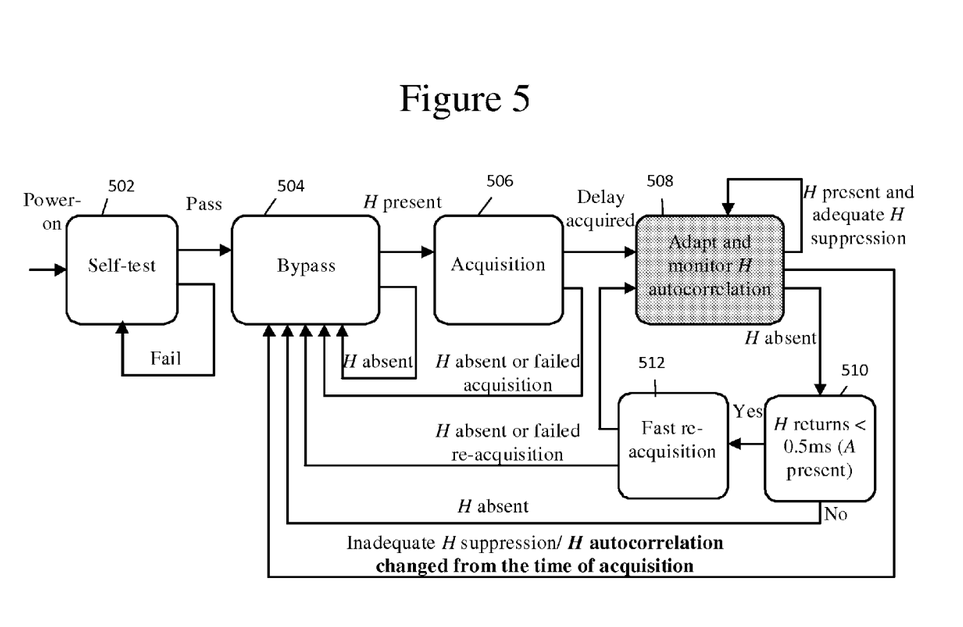
FIG. 5 is a state diagram of a state machine that allows periodic interference cancellation.

FIG. 5 shows a state machine allowing periodic interference cancellation. Upon power-up, the state machine enters a self-test state 502. Once the state machine passes self-test, it goes into a bypass state 504 until H is determined to be present, whereupon it enters an acquisition state 506. Once the delay is acquired, the state machine enters state 508, in which it adapts and monitors the H autocorrelation.

If there is inadequate H suppression, or if the H autocorrelation has changed from the time of acquisition, the state machine returns to the bypass state 504. On the other hand, if H is simply no longer present, the state machine passes from state 508 to state 510 in which it determines whether H returns within a given time (in the illustrative example, 0.5 ms) and A is present. If not, the state machine returns to the bypass state 504. If H does return within the given time, the state machine enters a fast-reacquisition state 512. If H is absent or the reacquisition fails, the state machine returns to the bypass state 504. Otherwise, it returns to the adaptation and monitoring state 508.

The change in the MSE depends on the signal's periodic-to-aperiodic (if the latter is predominant, then even a small periodicity change produces a large MSE change) component ratio and/or the crest-factor of the autocorrelation function. However, we assume that the aperiodic component does not dominate the periodic component (if it did, then we would not need this loss-of-synchronization detector) and that the autocorrelation rolls off over a 1-symbol interval (slightly more than 1 complex-sample duration).

Typically, MSE when loading changes is about $2 \times 10^{-2}$ (for a 10% change in periodicity or data loading) when compared to an MSE of $5 \times 10^{-4}$ under constant periodicity/loading conditions. A significant MSE (say, more than a threshold of $5 \times 10^{-3}$) triggers loss of synchronization and re-acquisition (to estimate an exact delay or a new ambiguous delay). The threshold is derived based on acceptable false alarm and missed detection probabilities. At the expense of time taken to arrive at a decision, the former probability can further be reduced by requiring that N sequential hypothesis/tests (we chose N=8) all indicate that the delay and/or Doppler are/is invalid.

Figure 6:
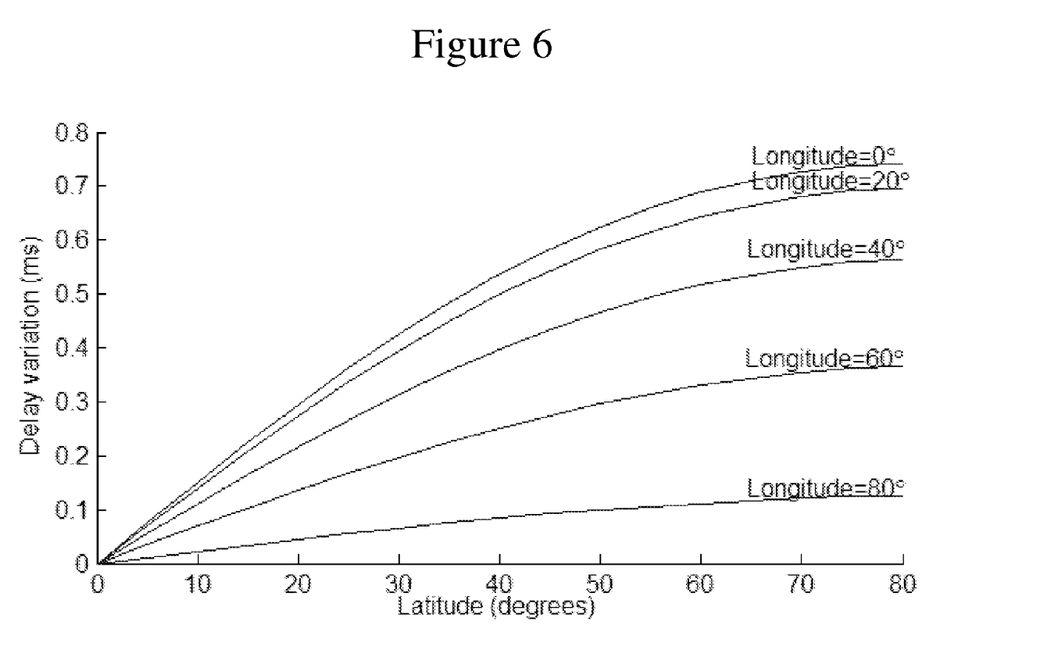
FIG. 6 is a plot of the delay variation for an orbital inclination of 0.5°.

In TDMA systems, the hub transmits to various remote systems in packet slots. Depending on the number of remotes being active at a given instant, hub traffic tends to be periodic for inactive remotes and random for the active remotes, causing partial data loading. If the periodicity due to such partial loading is greater than the range of satellite round trip delay ($\tau_e$) of an earth station, i.e., $\tau_p > \Delta\tau_e$, then we could choose the actual delay itself instead of an ambiguous one. The distance between an earth station and a satellite is $R=[R_e^2+(R_o+R_e)^2-2R_e(R_o+R_e) \cos(\theta-i) \cos \phi]^{1/2}$, where $\theta$=latitude of earth station, $\phi$=satellite longitudinal shift from earth station latitude, i=inclination, $R_o$=35,786 km, and $R_e$=6,378 km. Hence, $\tau_e=2 \cdot R/c$, where c is 300,000 km/s. For example, assuming up to ±0.5° shift in the inclination of a satellite over a day, the minimum and maximum round trip delays seen by an earth station with $\theta=19.2°$ and $\phi=37.0322°$ are 250.022 ms and 250.244 ms, i.e., $\tau_e=250.111$ ms. For this earth station if $\tau_p>111$ µs, the exact delay is automatically estimated by modifying the delay search range to $\tau_e-\tau_p/2:\tau_e+\tau_p/2$. FIG. 6 shows the delay variation due to earth station location and satellite orbital inclination of 0.5°. From the data one could infer that exact delay can be acquired for TDMA hubs also with at least 2 ms of periodicity by generalizing the search range to $\tau_e-1$ ms:$\tau_e+1$ ms. Further, when accurate delay is acquired under such partial loaded conditions, the state machine for change in periodicity detection described in above section should be disabled, to avoid false re-acquisition due to changes in data loading.

While a preferred embodiment has been set forth in detail above, those skilled in the art who have reviewed the present disclosure will readily appreciate that other embodiments can be realized within the scope of the invention. For example, numerical values are illustrative rather than limiting, as are mentions of specific technologies. Therefore, the present invention should be construed as limited only by the appended claims.

We claim:

1. A method for interference cancellation in a satellite communication system, the method comprising:
   (a) transmitting a hub signal from a first station to a second station via satellite;
   (b) receiving a hub echo signal in the first station;
   (c) in a computing device, performing an autocorrelation on the hub signal to detect a periodicity in the hub signal;
   (d) if the periodicity is detected, determining, in the computing device, a search range for a delay in the hub echo signal in accordance with the periodicity;
   (e) locating the delay in the hub echo signal, using the computing device; and
   (f) in the computing device, performing the interference cancellation in accordance with the delay located in step (e).

2. The method of claim 1, wherein step (d) comprises determining the search range for the delay in accordance with the periodicity detected in step (c) and an estimated satellite round-trip delay of the first station.

3. The method of claim 1, wherein, if the periodicity is not detected, the search range for the delay is set to a default range.

4. The method of claim 1, wherein the delay is located a plurality of times for a plurality of successively higher sampling rates.

5. The method of claim 4, wherein the plurality of successively higher sampling rates comprises a sampling rate that is higher than a signal bandwidth of the hub signal.

6. The method of claim 1, further comprising determining a Doppler value, and wherein step (d) comprises determining a search range for the Doppler value in accordance with the periodicity.

7. The method of claim 6, wherein:
   the delay is located a plurality of times for a plurality of successively higher sampling rates; and
   for a lowest one of the sampling rates, a fine Doppler value and coarse delay are determined.

8. The method of claim 7, wherein the plurality of successively higher sampling rates comprises a sampling rate that is higher than a signal bandwidth of the hub signal.

9. The method of claim 1, further comprising:
   (g) monitoring the autocorrelation performed in step (c);
   (h) from the monitoring performed in step (g), detecting a change in either the periodicity or a periodic-to-aperiodic ratio of the hub signal; and
   (h) when the change exceeds a threshold, re-acquiring the hub signal and performing steps (c)-(f) in accordance with the re-acquired hub signal.

10. A system for interference cancellation in a satellite communication system, the system comprising:

a communication component for transmitting a hub signal to a remote station via satellite and for receiving a hub echo signal; and a computing device, in communication with the communication component, the computing device configured for:

performing an autocorrelation on the hub signal to detect a periodicity in the hub signal;

if the periodicity is detected, determining a search range for a delay in the hub echo signal in accordance with the periodicity;

locating the delay in the hub echo signal; and performing the interference cancellation in accordance with the delay.

11. The system of claim 10, wherein the computing device is configured for determining the search range for the delay in accordance with the periodicity and an estimated satellite round-trip delay.

12. The system of claim 10, wherein the computing device is configured such that, if the periodicity is not detected, the search range for the delay is set to a default range.

13. The system of claim 10, wherein the computing device is configured such that the delay is located a plurality of times for a plurality of successively higher sampling rates.

14. The system of claim 13, wherein the computing device is configured such that the plurality of successively higher sampling rates comprises a sampling rate that is higher than a signal bandwidth of the hub signal.

15. The system of claim 10, wherein the computing device is further configured for determining a Doppler value and for determining a search range for the Doppler value in accordance with the periodicity.

16. The system of claim 15, wherein the computing device is configured such that:

the delay is located a plurality of times for a plurality of successively higher sampling rates; and for a lowest one of the sampling rates, a fine Doppler value and coarse delay are determined.

17. The system of claim 16, wherein the computing device is configured such that the plurality of successively higher sampling rates comprises a sampling rate that is higher than a signal bandwidth of the hub signal.

18. The system of claim 10, wherein the computing device is further configured for:

monitoring the autocorrelation;

from the monitoring, detecting a change in either the periodicity or a periodic-to-aperiodic ratio of the hub signal; and when the change exceeds a threshold, re-acquiring the hub signal and performing the operations of performing the autocorrelation through performing the interference cancellation in accordance with the re-acquired hub signal.

19. An article of manufacture for interference cancellation in a satellite communication system, the article of manufacture comprising:

a machine-readable tangible persistent storage medium; and code stored on the medium, the code, when executed on a computing device, controlling the computing device for:

(a) transmitting a hub signal from a first station to a second station via satellite;

(b) receiving a hub echo signal in the first station;

(c) performing an autocorrelation on the hub signal to detect a periodicity in the hub signal;

(d) if the periodicity is detected, determining a search range for a delay in the hub echo signal in accordance with the periodicity;

(e) locating the delay in the hub echo signal; and (f) performing the interference cancellation in accordance with the delay located in step (e).

* * * * *